R. H. WHITE AND M. B. MORGAN.
DUSTPROOF BEARING.
APPLICATION FILED JUNE 23, 1919.
1,387,087.   Patented Aug. 9, 1921.
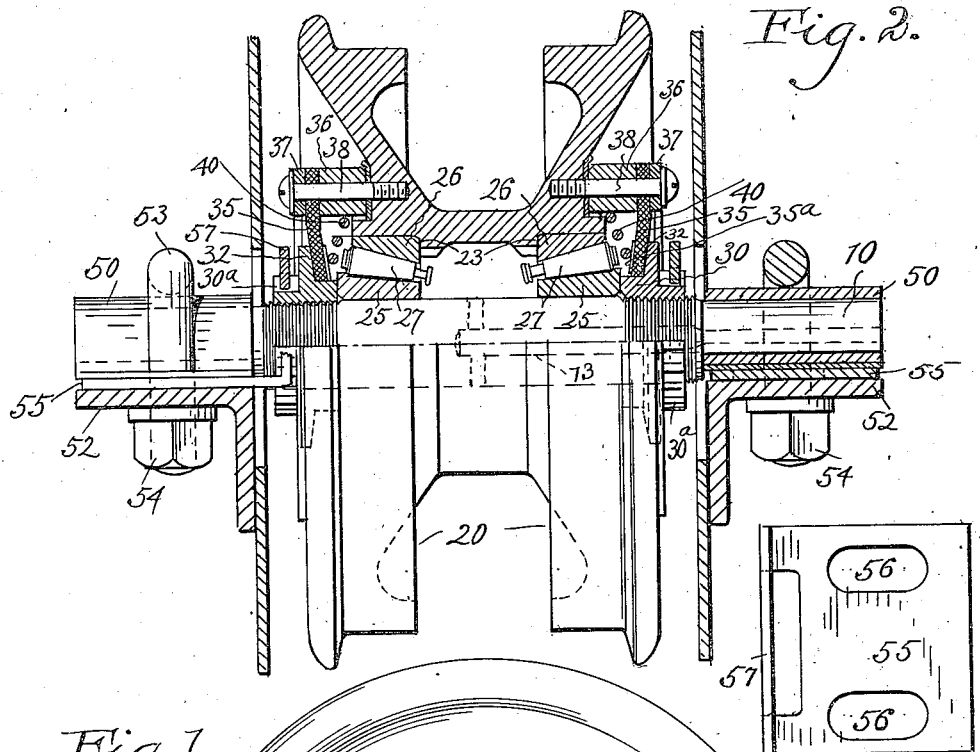
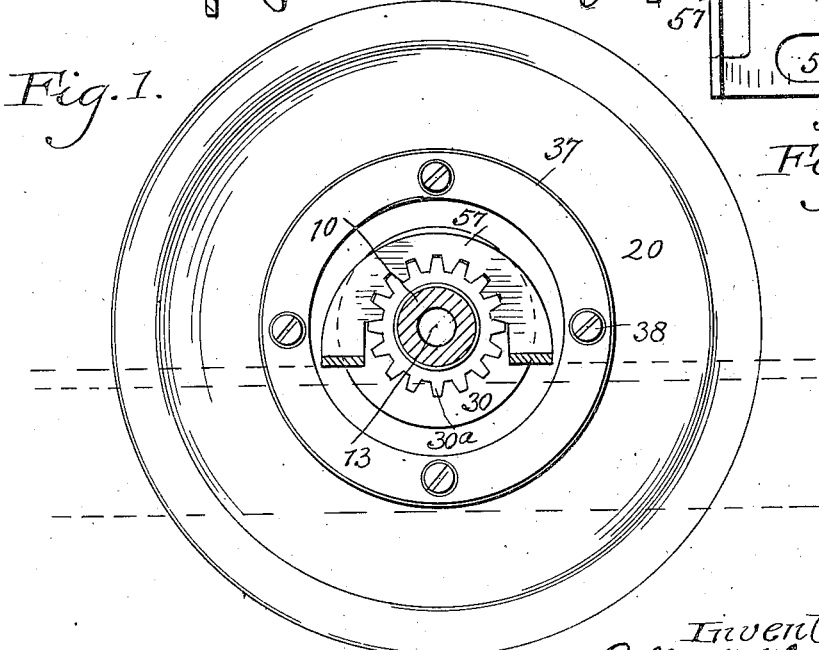
Inventors
Rollin H. White and
Mathew B. Morgan
By
Thurston Kwis & Hudson
attys.

UNITED STATES PATENT OFFICE.

ROLLIN H. WHITE AND MATHEW B. MORGAN, OF CLEVELAND HEIGHTS, OHIO, ASSIGNORS TO THE CLEVELAND TRACTOR COMPANY, OF EUCLID, OHIO, A CORPORATION OF OHIO.

DUSTPROOF BEARING.

1,387,087. Specification of Letters Patent. Patented Aug. 9, 1921.

Application filed June 23, 1919. Serial No. 306,120.

*To all whom it may concern:*

Be it known that we, ROLLIN H. WHITE and MATHEW B. MORGAN, citizens of the United States, and residents, respectively, of Cleveland Heights, in the county of Cuyahoga and State of Ohio, and Cleveland Heights, in the county of Cuyahoga and State of Ohio, have invented a certain new and useful Improvement in Dustproof Bearings, of which the following is a full, clear, and exact description.

The object of this invention is to exclude mud and dust from the bearings between two relatively rotatable members, one of which embraces the other. In the embodiment of the invention shown in the drawings, the outside or embracing member is a wheel, and the inner member is a non-rotating shaft upon which the wheel is rotatably supported. It is, however, not material which of these two parts actually rotates; nor is the shape of the two parts remote from the bearings of any consequence in respect to the present invention.

The invention is particularly useful on tracks or other machines which are used under conditions where there is a lot of dust to contend with. The invention is shown in connection with one of the track wheels of a track laying tractor.

The invention consists in the construction and combination of parts shown in the drawings and hereinafter described and pointed out definitely in the appended claims.

In the drawings, Figure 1 is an end view of the preferred embodiment of the invention, and Fig. 2 is a front elevation, the upper half being in radial section. Fig. 3 is a detached plan view of locking member 55.

Referring to the parts by reference characters, 10 represents the nonrotating shaft, and 20 a wheel which loosely embraces and is rotatably supported thereby. Between these two parts there are antifriction bearings of familiar form, one in each end of the wheel. The particular antifriction bearings shown are the variety known in the trade as Timken roller bearings; but almost any other annular antifriction bearing could be substituted. As shown, each of these bearings consists of an inner bearing ring 25 which embraces and is fitted on the shaft; an outer bearing ring 26 which is fitted within a coaxial cylindrical hole in the end of the hub of the wheel; and a plurality of rollers 27 which are interposed between the oppositely inclined opposed faces of these two bearing rings. The outside bearing rings engage at their inner ends with shoulders 23 within the wheel, and thereby their positions with respect to said wheel are fixed. The positions of the inner bearing rings are fixed by means of two collars 30 which are secured upon the shaft in engagement respectively with the outer ends of these inner bearing rings. The one or the other of these collars 30, (preferably both), is adjustable, and this adjustability is due to the fact that the collar screws onto the shaft. The bearings as described are well known and are typical of the bearings to which the present invention is applicable for the purpose of excluding mud and dust therefrom.

There are two annular packing disks 35 preferably made of leather, and secured respectively to opposite ends of the wheel. These packing disks are secured near their outer peripheries to the wheel by being clamped between two washers 36, 37, by means of screw bolts 38 which pass through these washers and through the packing ring and screw into the wheel. The otherwise free inner part of each packing disk extends toward the axis of the shaft between the adjacent annular bearing and the inner end of the adjacent collar 30; and is springpressed into intimate contact with the inner end face of that collar. This spring 40 as shown is a spiral spring which surrounds the shaft and is fitted into the end of the wheel, and is in contact with the outer end of the outer bearing ring 26. At its other end this spring engages the inside face of the packing disk 35, or more exactly, it engages a thin metal ring 35ª which is fixed to the inner face of said packing disk, in order to distribute the pressure of the spring. The action of the spring is to press this packing disk tightly against the inner end face of the adjacent collar. The end faces of the collars are enlarged so as to afford wide bearing surfaces for the packing disks by means of a flange 32 formed on the inner end of each collar.

In order to supply lubricant to the so protected bearings within the wheel an oil duct 13 is formed through the shaft from one end thereof, and at its inner end extends radially outward through the shaft, and is in communication with the central chamber within the wheel between the two antifriction bearings. Oil or grease may be forced into this annular chamber through this oil duct.

The maintenance of the collars 30 in the adjusted positions is necessary; and likewise it is necessary to provide means which will permit of their adjustment. To effect these results, especially when the invention is employed in connection with the track laying tractor, the following construction is provided. The shaft 10 is non-rotatably fixed near its ends in boxes 50, each of which rests upon one of the spaced apart flanges 52 of the track frame of a track laying tractor. An inverted U-bolt 53 embraces each box and goes down through holes in said flange, and the box is clamped down upon the flange when the nuts 54 are tightened up in the lower end of said U-bolts. Between each block 50 and the supporting flange 52 is a plate 55 having slots 56 through which the U-bolts pass. The inner end of this plate is bent upward in the form of an internally serrated arch 57, the sides of which go up on opposite sides of the shaft. Each collar 30 has a longitudinally serrated rear end 30<sup>a</sup> with which the serrated inner surface of the arch 57 may engage.

In order to be able to turn a collar 30 for adjustment purposes the U-bolt nuts must be loosened and this plate 55 moved outward so as to carry the serrated arch out of engagement with the serrated end of the collar. When the collar has been adjusted this plate is moved inward to again cause the serrated arch thereof to engage the serrated end of the collar and the U-bolt is tightened.

Having described our invention, we claim:—

1. The combination with a shaft, a wheel rotatably mounted thereon, a collar on the shaft adjacent an end of the wheel, a flexible packing disk which is fixed near its periphery to the end of the wheel and which is in sliding contact with the end face of said collar, and spring means for maintaining the contact of said parts.

2. The combination with a shaft, a wheel rotatably mounted thereon, and antifriction bearings interposed between said wheel and shaft, of collars secured to the shaft adjacent the ends of the wheel, and flexible packing disks,—each of which is clamped near its outer periphery to the end of the wheel and is in contact with the inner end face of the adjacent collar.

3. The combination with a shaft, a wheel rotatably mounted thereon, and antifriction bearings interposed between said wheel and shaft, of collars secured to the shaft adjacent the ends of the wheel, and flexible packing disks,—each of which is clamped near its outer periphery to the end of the wheel and is in contact with the inner end face of the adjacent collar, and spring means in the wheel acting to press said packing ring into intimate contact with said collar.

4. The combination with a shaft, a wheel rotatably mounted thereon, and antifriction bearings interposed between said wheel and shaft, of collars secured to the shaft adjacent the ends of the wheel, and packing rings each packing ring being clamped near its outer periphery to the end of the wheel and being in contact with the inner end face of the adjacent collar, a coil spring within the wheel surrounding the shaft and compressed between a part of the wheel and said packing ring whereby the latter is pressed against the inner end face of the associated collar.

In testimony whereof, we hereunto affix our signatures.

ROLLIN H. WHITE.
MATHEW B. MORGAN.